Aug. 19, 1941.   P. H. MISTRAL   2,253,190
SUSPENSION OF VEHICLES
Filed Jan. 14, 1939   5 Sheets-Sheet 1
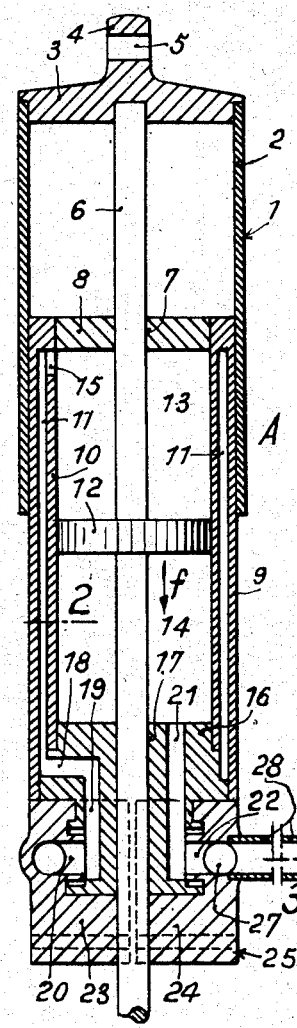
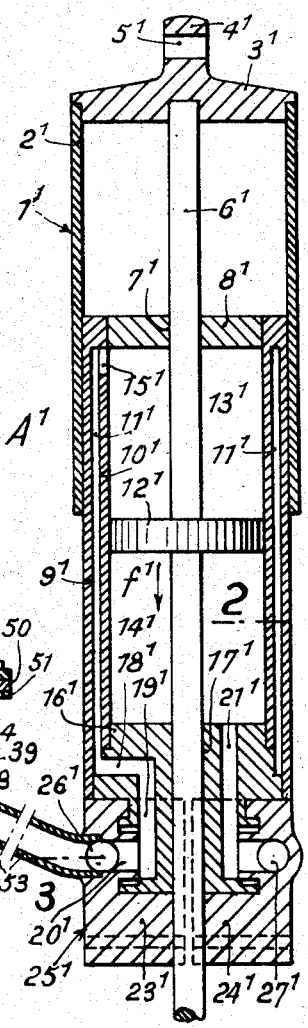
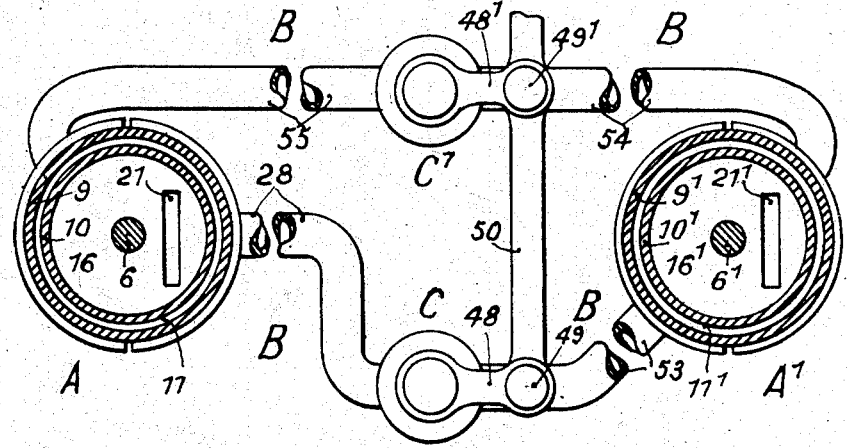
INVENTOR:
PAUL HENRI MISTRAL
BY Haseltine Lake & Co.
ATTORNEYS Aug. 19, 1941.   P. H. MISTRAL   2,253,190
SUSPENSION OF VEHICLES
Filed Jan. 14, 1939   5 Sheets-Sheet 2
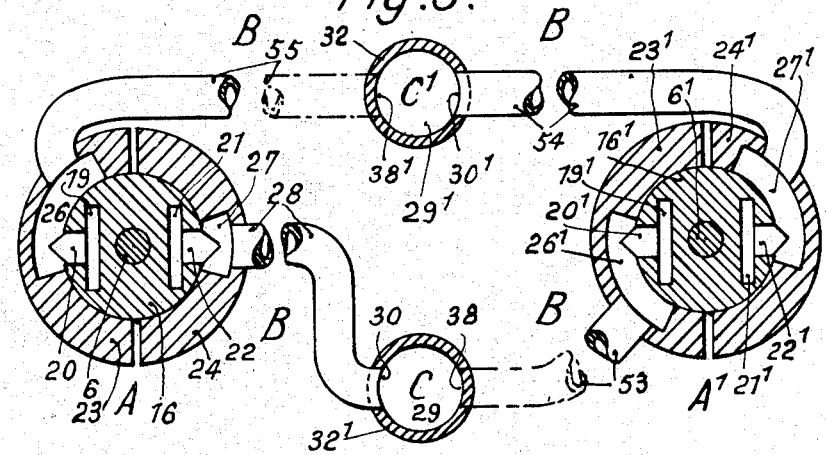
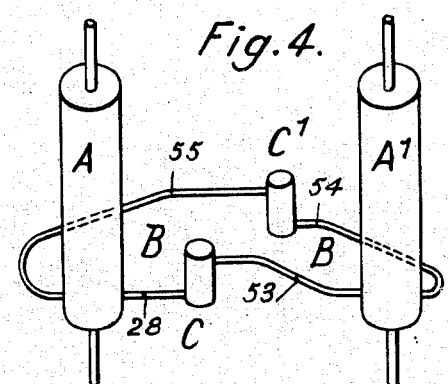
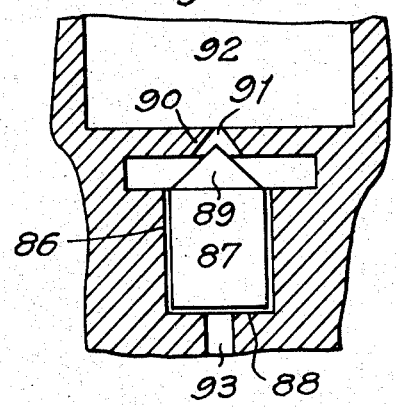
INVENTOR:
PAUL HENRI MISTRAL
BY Haseltine, Lake & Co.
ATTORNEYS

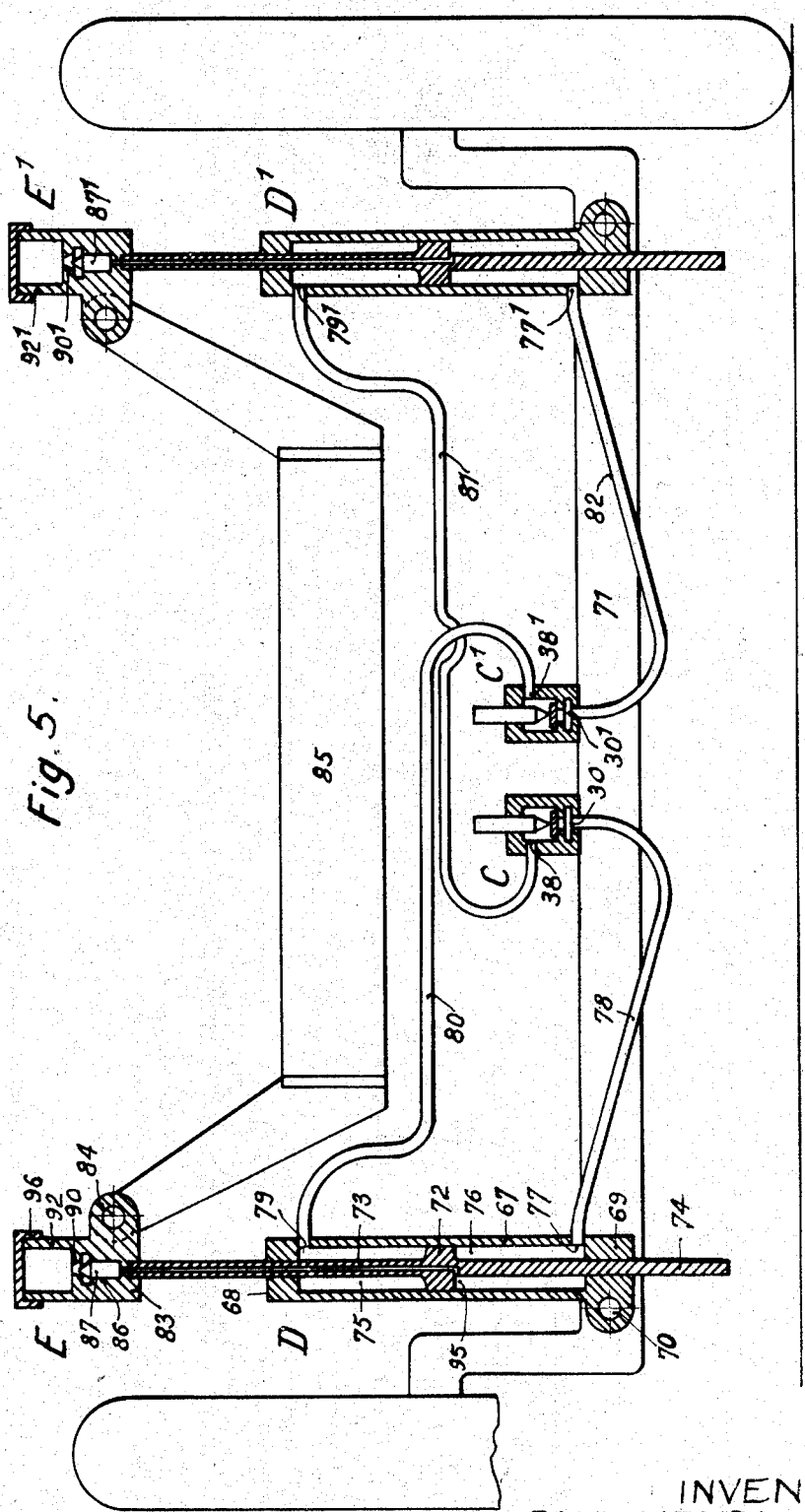

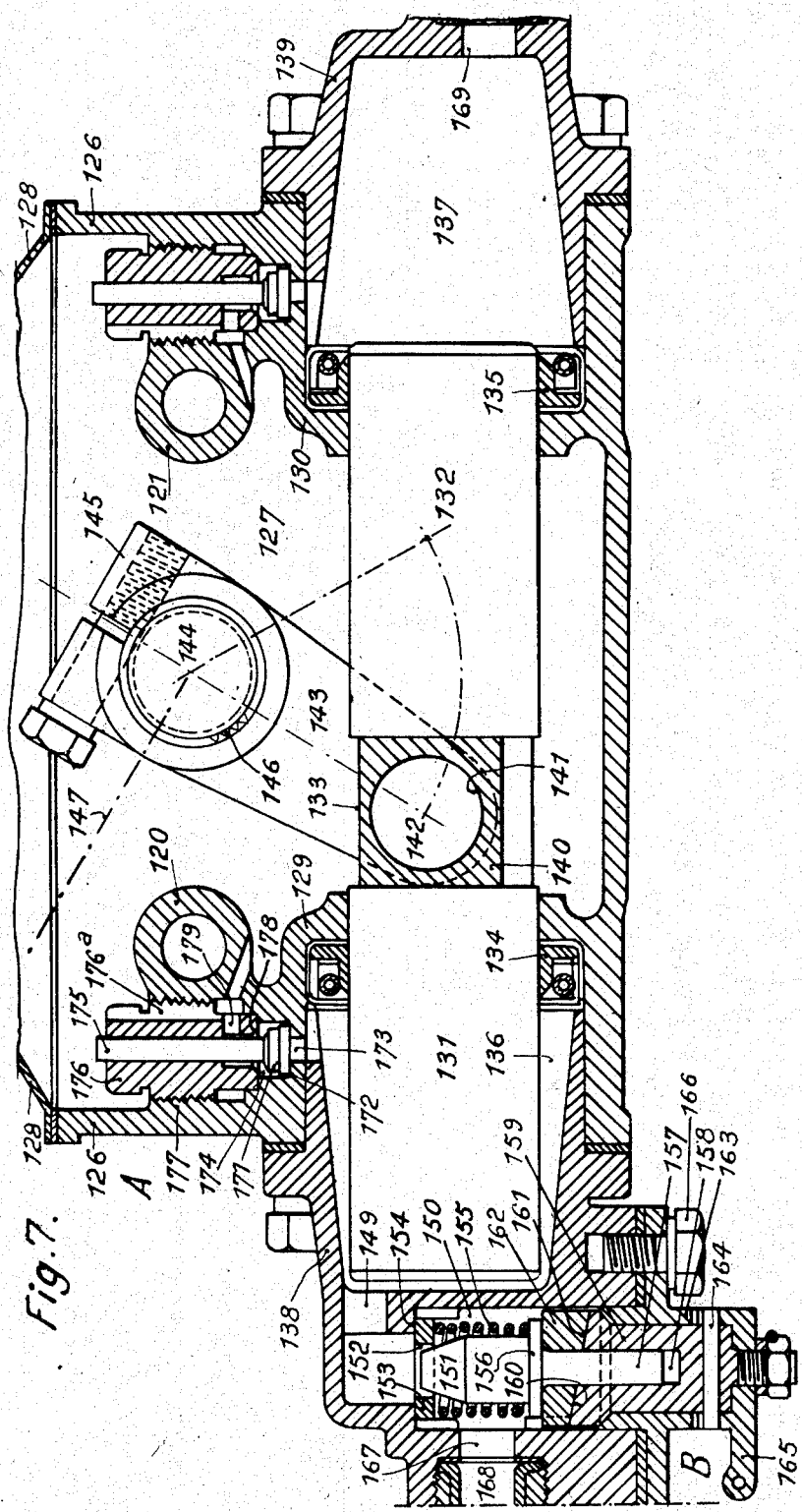

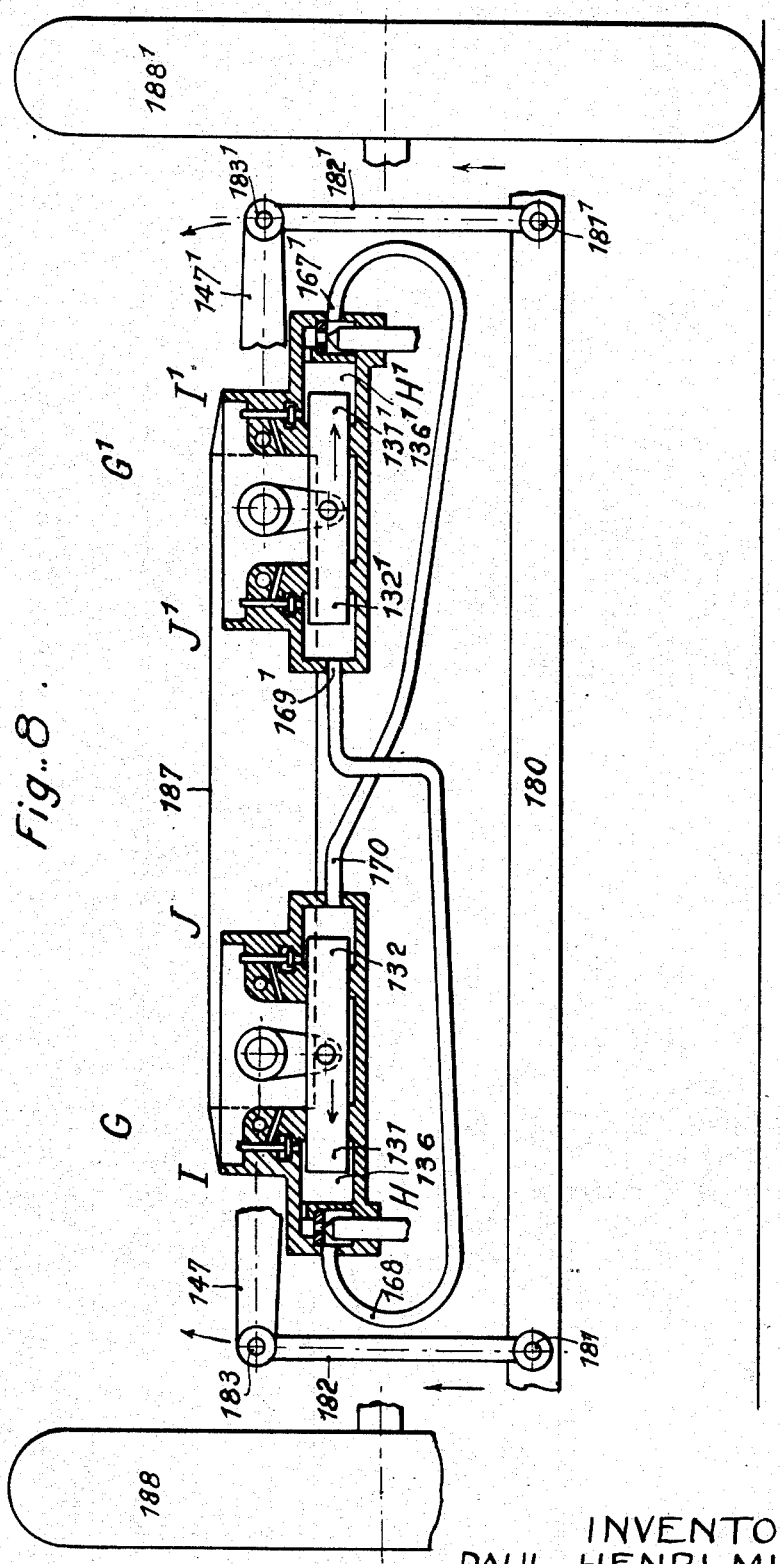

UNITED STATES PATENT OFFICE 2,253,190

SUSPENSION OF VEHICLES

Paul Henri Mistral, Paris, France

Application January 14, 1939, Serial No. 250,882
In France January 19, 1938

6 Claims. (Cl. 280—124)

The invention relates to the suspension of vehicles, in particular automobile vehicles, of the double track type, that is to say which rest on the ground by means of wheels arranged in pairs, the wheels of one pair having a transversely directed axis of rotation.

Such vehicles, while traveling, are frequently subjected to efforts which are unsymmetrical with respect to the longitudinal axis, viz.: efforts arising due to unevenness of the rolling surface, efforts due to the action of centrifugal force when negotiating curves, effect of transverse declivities in the road surface. Such efforts tend to cause untimely inclinations of the vehicle, which are detrimental to the safety and to the comfort of the occupants.

The invention has for its object to eliminate these drawbacks in a simple and efficient manner by providing an arrangement wherein the suspended part of the vehicle rests on the unsuspended part through the intermediary of at least one pair of suitably interconnected hydraulic devices, each corresponding to one side of the vehicle, the hydraulic connections between said devices being arranged in such manner that the movement of the movable member of one of tthe devices causes an equal movement in the same direction of the movable member of the other device.

Under these conditions, when the suspended part corresponding to one side of the vehicle, becomes deformed, the part of the suspension corresponding to the other side will be automatically deformed or develop a tendency of becoming deformed in the same manner. The substantial result of this is that, for example, a plane which is rigidly connected to the suspended part of the vehicle and under normal conditions is parallel to the rolling surface, will remain parallel to said surface during the time of operation of the vehicle.

In particular, when, while negotiating a curve, the part of the suspension which corresponds to one of the sides of the vehicle is depressed under the action of centrifugal force, the corresponding part of the suspension on the other side is depressed the same amount, so that the entire suspended part of the vehicle will be lowered.

When near the edge of a high crowned road bed, the depression of the suspension obtaining on the lowermost side of the vehicle is compensated by a corresponding depression of the suspension belonging to the other side.

In the arrangement according to the invention spaces located on either side of the movable member of each of the hydraulic devices on both sides of the vehicle are interconnected by means of a first hydraulic connection between spaces located in one of the devices on a certain side with respect to the movable member in the other device on the other side of the movable member respectively a second hydraulic connection being established between the two remaining spaces located differently with respect to their respective movable member from the first named spaces.

The invention also covers a hydraulic arrangement comprising means provided on each of the hydraulic connections, for causing the liquid to circulate more readily in one direction than in the other and, more precisely for causing the liquid to circulate more readily in the direction corresponding to the depression of the suspension proper than in that which corresponds to its relaxation. Thus, in a very simple manner, an arrangement is obtained which acts both as a shock-absorber and stabilizer.

The invention thus provides a hydraulic connection between the shock-absorbing devices belonging to each of the sides of the vehicle, said hydraulic connection being such that the movements of the movable members of the shock-absorbers shall be alike and take place in the same direction.

Several embodiments of a shock-absorbing-stabilizing arrangement according to the invention will be described hereafter with reference to the accompanying drawings in which:

Fig. 1 is a diagrammatical view, in vertical section, of a shock-absorbing-stabilizing arrangement according to the invention;

Fig. 2 is a section along the line 2—2 of Fig. 1;

Fig. 3 is a section along the line 3—3 of Fig. 1;

Fig. 4 is a very simplified perspective view, showing the relative arrangements of the shock-absorbers and of the valve boxes;

Fig. 5 is a diagrammatical front view, in partial section, of another embodiment of the shock-absorbing-stabilizing arrangement according to the invention;

Fig. 6 shows a section of a detail of said arrangement;

Fig. 7 shows a vertical section of another embodiment of a shock-absorbing device;

Fig. 8 is a diagrammatical general view of a shock-absorbing device shown in Fig. 7.

Reference will first be had to Figs. 1 to 4 which show diagrammatically a shock-absorber-stabilizer device according to the invention, adapted for use on either the front or the rear wheel train of an automobile vehicle. Such device comprises a first hydraulic mechanism A, by means of which one side of the suspended part of the vehicle is supported by the unsuspended part, a second similar mechanism $A^1$ being provided for supporting the other side; these hydraulic mechanisms are connected to each other by means of a double hydraulic connection B on which are interposed valve boxes C and $C^1$.

The hydraulic device A, for example, is provided with a cover 1 comprising a cylindrical body 2 on which is fitted a cap 3 formed with an upwardly extending lug 4 having an eye 5 for the pivotal connection to the chassis of the vehicle. Fitted into the inner face of cap 3 is a piston rod 6 extending through a central opening 7, of a wall 8 forming the upper end of an outer cylinder 9, as well as that of a coaxial inner cylinder 10. An annular open space 11 is formed between the outer surface of cylinder 10 and the inner surface of cylinder 9 respectively; on the piston rod 6 is fixed a piston 12 delineating an upper chamber 13 and a lower chamber 14, and is adapted for sliding movement in the inner cylinder 10. The upper chamber 13 communicates with the annular space 11 through an orifice 15 provided at the upper part of the cylinder 10. The diameter of the body 2 of the cover 1 and that of the outer cylinder 9 are such that the cover 1 and said cylinder can move in sliding engagement to each other. The lower portions of cylinders 9 and 10 respectively are closed by a common bottom part 16. The part 16 is provided with an axial bore 17, forming passage for the piston rod 6. It is furthermore provided with a radial channel 18 communicating with the annular space 11 and which is extended by a vertical passage 19 opening into an orifice 20. The part 16 is provided with a second vertical passage 21 which opens, at its upper part, into the chamber 14 and, at its lower part, into an orifice 22 diametrically opposite the orifice 20. The bottom part 16 is surrounded by the plates 23 and 24 which form a part 25 for connecting to the unsuspended part of the vehicle, for example. The plates 23 and 24 are provided with openings 26 and 27 which respectively extend the openings 20 and 22.

The construction of the device $A^1$ is similar to that of device A. In the drawings, like parts of the two devices have been marked with like reference numerals, the parts relating to the device $A^1$ bearing the index "1."

From the opening 27 (device A) extends a tube 28 which opens through an orifice 30 into the lower chamber 29 of a valve box C. The chamber 29 is closed, downwardly by a bottom part 31, laterally by a cylindrical body 32 and upwardly by a partition 33 provided with wide peripheral perforations 34 and with a central orifice 35. On the partition 33 rests a washer 36 provided with a central orifice 37. An upper orifice 38, on the body 32 is arranged in such manner as to open into the lower chamber 29 as soon as the washer 36 is lifted from the partition 33. Under normal conditions, the washer 36 remains resting on the partition 33 under the action of a light spring 39. With the orifice 37 co-operates a needle valve 40 on the collar 41 on which bears the spring 39. The upper face 42 of said collar forms a helical slope which co-operates with a conjugated helical slope formed at the base of a small block 43 which furthermore acts as a housing for the tail 44 of the needle valve which is held against rotation by a rib 45. Said small block 43 is rotatably mounted in an intermediate part 46 secured to the body 32; its upper end receives, by keying, the head 47 of a lever 48, the other end of which is connected, by means of a stud 49, to a connecting rod 50, with a maintaining washer 51. A stuffing-box 52 makes the valve box fluid-tight. From the upper orifice 38 extends a tube 53 which opens into the orifice $26^1$.

The construction of the valve box $C^1$ is similar to that of the valve box C. Its lever $48^1$ is likewise mounted, by means of a stud $49^1$, on the connecting rod 50. The lower orifice $30^1$ of the valve box $C^1$ communicates, through a tube 54, with the orifice $27^1$; the upper orifice $38^1$, communicates, through a tube 55, with the orifice 26 (Fig. 3). The whole system is filled with a liquid, for example oil.

The operation of said system is as follows:

Under normal conditions, that is to say when inoperative, and the vehicle being loaded as provided for, the various members are in the position shown in Fig. 1.

If, for any reason, the suspended part of the vehicle moves downwards on one side, for example if the piston 12 slides downwards in the cylinder 10 in the direction of the arrow $f$, a part of the liquid contained in the chamber 14 is forced through the passage 21, the orifices 22 and 27, the tube 28, into the lower chamber 29; the influx of liquid lifts the washer 36 against the action of the light spring 39 and the liquid flows without appreciable resistance through the perforations 34 directly into the tube 53. It flows through the orifices $26^1$ and $20^1$, through the passage $19^1$, the radial channel $18^1$, the annular space $11^1$, penetrates into the cylinder $10^1$ and pushes the piston $12^1$ downwards, in the direction of the arrow $f^1$, the same distance as the piston 12 has moved downwards. The liquid contained in the chamber $14^1$ is driven through the passage $21^1$, the orifices $22^1$ and $27^1$, and the pipe 54 up to the lower chamber $29^1$ of the valve $C^1$; it pushes back the washer $36^1$ and flows, without considerable resistance, into the tube 55 which conveys it, through the orifices 26 and 20, the passage 19, the radial channel 18, the annular space 11, the orifice 15, into the upper chamber 13 where it instantly fills the space left free by the depression of the piston 12.

It will therefore be seen that, by means of the system according to the invention, the deformation of the part of the suspension corresponding to one side of the vehicle is accurately reproduced by the part of the suspension belonging to the other side.

During the relaxation of the suspension that follows the depression phase which has just been described, the pistons 12 and $12^1$ move again upwards. The piston 12 pushes the liquid contained in the chamber 13; in front of it which will then circulate in the annular space 11, the radial channel 18, the passage 19, the orifices 20 and 26 and the tube 55. When arriving from the valve box $C^1$, the liquid in order to reach the lower chamber $29^1$ passes through the space left vacant between the needle valve $40^1$ and the central orifice $37^1$. Said space is so dimensioned that the liquid will be subjected to an effective braking action as it passes. It must be observed that, in this direction of flow of the liquid, the washer $36^1$ is pressed against the partition $33^1$ both by the spring $39^1$ and by the liquid flowing in through the tube 53. The liquid reaching the chamber $29^1$ is then conveyed, through the tube 54, the orifices 27¹ and 22¹, the passage 21¹, into the lower chamber 14¹. As the piston 12¹ has moved upwards simultaneously as the corresponding part of the suspension has been relaxed said liquid fills the space vacated by the forward movement of the piston 12¹. The forward movement of said piston has, in the same manner, driven liquid into the chamber 14, through the annular space 11¹, the orifices 20¹ and 26¹, the tube 53, the valve box C, the orifices 27 and 22, and the passage 21. Said liquid fills the space left empty by the upward movement of the piston 12. When the liquid from the valve box C circulates in this direction, it undergoes an effective braking effect, as described above. It will therefore be seen that the "rebound" effect, which would be caused by the too sudden expansion of the resilient suspension of the vehicle, is prevented by the braking that the liquid undergoes both in the valve box C and in the valve box C¹.

The control of the shock-absorbing effect is carried out in the simplest manner. By pushing in the needle valve 40, the free cross-section for the passage of the liquid is narrowed between said needle valve and the walls of the orifice 37 provided in the washer 36. The pushing in of the needle is effected, for example for the valve box C, by rotating the lever 48. This rotation involves that of the block 43, and the conjugated helical slopes both of said block and of the collar 41 cause the needle 40 to move downwards or upwards according to the direction of rotation of the lever 48. The coupling of the levers 48 and 48¹ enables, by the sole operation of the connecting rod 50, for example from the instrument panel, by means of a flexible transmission, the braking effect caused by each of the valve boxes C and C¹ to be simultaneously adjusted to the same value. It is therefore thus possible to modify instantly the flexibility of the suspension as a whole while the vehicle is running. This adjustment is effected without modifying the hydraulic devices A and A¹ which, furthermore, do not include any fragile member. As this adjustment modifies the position of the collar 41, which is the bearing member for the spring 39, the resistance of the washer 36 to lifting, the direction of "free" circulation of the liquid, is likewise modified.

In a modified embodiment, compressed air or another gas may be introduced into the cover 1 and 1¹, for example by means of valves provided on the ends 3 and 3¹ of said covers. In this case, of course, a perfect fluid-tightness is obtained between the cylindrical body 2 of the cover 1 and the outer cylinder 9 and also between the body 2¹ and the cylinder 9¹, so that a perfect suspension is thus obtained.

Fig. 5 shows diagrammatically a general view of a somewhat modified embodiment, in which each side is provided with a hydraulic device D and D¹ respectively each cooperating with a compensating box, E and E¹ respectively. In the transmissions interconnecting the devices D and D¹ are provided valve boxes C and C¹ of similar construction as those described above.

The device D comprises a cylinder body 67 having an upper end 68 and a lower end 69; an eye 70 provided in the lower end by means whereof, for fixing the axle 71 of the vehicle, or any suitable part attached thereto may be fixed. Displaceably mounted in the cylinder 67 is a corresponding piston 72 carried by a piston rod 73 having a counter-rod 74 which passes through the lower end 69. The piston 72 thus delimits an upper chamber 75 and a lower chamber 76 respectively. An orifice 77 at the base of the cylinder 67 opens into a tube 78 leading to the orifice 30 of the valve box C. At the upper part of the cylinder 67 is provided an orifice 79 into which opens a tube 80 leading to the orifice 38¹ of the valve box C¹. The device D¹, which is of the same construction as the device D, is connected through the upper orifice 79¹, by means of a tube 81, to the orifice 38 of the valve C; the lower orifice 77¹ is connected through the tube 82 to the orifice 30¹ of the valve C¹.

The compensating valve E comprises a body 83 which is secured to the piston rod 73 and connected to the vehicle body by means of an eye 84. In the body 83 is provided a housing 86 (see Fig. 6) for a needle valve block 87 which rests, by its proper weight, on the wall 88 of said housing, and the point 89 of which is opposite a corresponding conical seat 90 having a central orifice 91 opening into a reservoir 92. An orifice 93 establishes communication of the housing 86 with a channel which extends all along the piston rod 73 and opens, through an orifice 95, into the chamber 76. A plug 96 is fitted on top of the reservoir 92. The construction of the compensating valve E¹ is similar to that of the valve E.

The operation of this hydraulic system is the same as that which has been described above. During the operative periods, the over-pressure prevailing in the hydraulic circuit bears the needle valves 87 and 87¹ against their seat 90—90¹, thereby isolating the circuit from the outside. When inoperative, the expansions or contractions of the liquid in said circuit are compensated for by the transfer of liquid into or from the reservoirs 92—92¹, by passing between the needle-valves and their seat.

In Fig. 7 an embodiment has been shown of a hydraulic device which belongs to one of the sides of the vehicle and in which the pistons move horizontally. In this embodiment, the body 126 of the device limits the reservoir 127 for the liquid. It is capped by a cover 128. It is provided with cylindrical bearing surfaces 129 and 130 in which slide the plunger pistons 131 and 132 respectively which are secured to each other by a collar 133. Leather packings 134 and 135 ensure fluid-tightness of the sliding. The piston 131 moves inside a chamber 136 whereby the actual volume of the chamber may be varied. The piston 132 moves inside a similar chamber 137. The chambers 136 and 137 are respectively formed in ends 138 and 139 which are fitted on the body 126. The latter is fixed, by any suitable means, such as bosses 120 and 121 to the chassis of the vehicle. The collar 133 is provided with a plane groove acting as a housing for a square 140 having a central opening 141 which receives a finger 142 that forms the end of a crank pin 143 fixed on a shaft 144 by means of a clamping of a collar 145. Connected by means of grooves 146 to the shaft 144 is an arm 147, the end 148 of which is connected to a member secured to the wheel. The chamber 136 is connected, through a channel 149, to a housing 150 in which is lodged a needle valve 151 which is locked against rotation and co-operates with an opening 152 provided in a ring 153 which is urged against its seat 154 by a light spring 155. Said spring bears on a circular projection 156 provided on the needle valve 151. The tail 157 of the latter is lodged in a hole 158 provided in a small block 159 which is provided with a helical slope 160 co-operating with a conjugated helical slope 161 of a washer 162 which is interposed between the block 159 and the circular projection 156. The small block 159 is rotatably mounted in the body 163 and its end is connected, by means of a key 164, to an adjusting lever 165. Bolts 166 connect the body 163 to the end 138. The housing 150 communicates, through an orifice 167, with a tube 168. The chamber 137, in turn, is in communication with a tube 170 through an orifice 169.

The device for compensating, filling and exhausting the air, for each of the chambers 136 and 137, comprises a valve 171 which, under normal conditions, rests by its proper weight on a wall 172 whereby an orifice 173 in this wall serves to establish communication between the valve housing 174 and the chamber 136. The tail 175 of the valve 171 is guided in a guide member 176 which is screwed into a boss 177 of the wall 126 of the reservoir. The seat 178 for the valve forms the orifice of a conduit 179 which opens into said reservoir. The guide member 176 has a bore 176a for the exhaust of the air as may be contained in the circuit.

A general view of a wheel train of an automobile vehicle equipped with the devices which have just been described is shown in Fig. 8. On the axle 180, towards one of its ends, on the left of the figure, an arm 182 is mounted for pivoting movement about the shaft 181, the other end 183 of said arm being pivoted on the arm 147 of a device G. Towards the other end of the axle 180 an arm 182¹ is pivoted at 181¹ the opposite end 183¹ of which is pivoted on the arm 147¹ of the device G¹. The devices G and G¹ are fixed to the chassis 187. Each of them comprises, as described, a shock-absorbing box H and compensating devices I and J. The tube 168 opens into the orifice 169¹, and the tube 170 opens into the orifice 167¹. The operation of this system is similar to that of the systems described above. If, for example, the part of the suspension which involves the left wheel 188 is depressed, the arm 147 rotates in a clockwise direction; the pistons 131 and 132 move towards the left; the liquid which is driven by the piston 131 passes through the shock absorbing box H without encountering any appreciable resistance, and pushes the group of pistons 132¹ and 131¹ towards the right. The liquid which is driven from the chamber 136 passes through the shock-absorbing box H¹, without encountering any appreciable resistance, flows through the tube 170 and fills the space which has been left free by the displacement of the pistons 131—132. The movement of the pistons 132¹ and 131¹ has caused a depression of the part of the suspension which involves the wheel 188¹ equal to that undergone by the part of the suspension which involves the wheel 188. When the suspension is relaxed, the liquid circulates in the opposite direction; its circulation is in this case braked by its passing through the shock-absorbing boxes H and H¹. The adjustment of said shock-absorbing boxes is effected in the manner which has been described above.

I claim:

1. Hydraulic damping device especially for vehicles in which two-chambered dampers have the first chamber in each connected to the second chamber in the other and which have a hydraulic circuit and a braking member for braking the liquid in one direction of movement of the latter in said circuit, said braking member being capable of adjustment for the purpose of introducing a greater resistance to the circulation of the liquid in said one direction and simultaneously also limited increase of the resistance of the circulation of the liquid in the other direction which is much lower than the first mentioned resistance and vice versa, the hydraulic circuit preferably having also a gravity tank in communication with said circuit, and means for interrupting said communication between said circuit and said gravity tank during any periods of time in which an excess pressure obtains in said circuit.

2. Hydraulic damping device according to claim 1, in which a calibrated orifice is provided in the braking member and a needle controls said orifice, a mobile member associated with the braking member in which said orifice is formed and a portion integral with said needle, there being resilient means bearing against said portion upon the needle serving resiliently to return the mobile member.

3. Hydraulic damping device according to claim 1, in which a calibrated orifice is provided in the braking member and a needle controls said orifice, and wherein means are provided including an inclined plane portion serving to control the position of the needle by rotation thereof and thereby longitudinally displacing the same for the purpose of braking the liquid in the hydraulic circuit.

4. Hydraulic damping device according to claim 1, in which a calibrated orifice is provided in the braking member and a needle controls said orifice, a mobile member associated with the braking member in which said orifice is formed and a portion integral with said needle, there being resilient means bearing against said portion upon the needle serving resiliently to return the mobile member, and wherein means are provided including an inclined plane portion serving to control the position of the needle by rotation thereof and thereby longitudinally displacing the same for the purpose of braking the liquid in the hydraulic circuit.

5. Hydraulic damping device according to claim 1, in which a pressure responsive valve is freely mounted and applied to its seat by the effect of excess pressure in the hydraulic circuit, said valve controlling the communication between said circuit and the gravity reservoir.

6. Hydraulic damping device according to claim 1, in which a calibrated orifice is provided in the braking member and a pressure responsive valve is freely mounted and applied to its seat by the effect of excess pressure in the hydraulic circuit, said valve controlling the communication between said circuit and the gravity reservoir, a needle controls said orifice, a mobile member associated with the braking member in which said orifice is formed and a portion integral with said needle, there being resilient means bearing against said portion upon the needle serving resiliently to return the mobile member.

PAUL HENRI MISTRAL.